(12) United States Patent
Courant et al.

(10) Patent No.: US 10,878,156 B1
(45) Date of Patent: Dec. 29, 2020

(54) PROBABILISTIC SIMULATION METHOD OF A MICROELECTRONIC DEVICE

(71) Applicant: SILVACO FRANCE, Montbonnot Saint Martin (FR)

(72) Inventors: Yoann Courant, Saint Ismier (FR); Firas Mohamed Monade, Saint Martin D'Heres (FR); Pierre Faubet, Domene (FR)

(73) Assignee: SILVACO FRANCE, Montbonnot Saint Martin (FR)

( * ) Notice: Subject to any disclaimer, the term of this patent is extended or adjusted under 35 U.S.C. 154(b) by 0 days.

(21) Appl. No.: 16/729,047

(22) Filed: Dec. 27, 2019

(51) Int. Cl.
*G06F 30/367* (2020.01)
*G06F 17/18* (2006.01)
*G06F 111/08* (2020.01)

(52) U.S. Cl.
CPC ............ *G06F 30/367* (2020.01); *G06F 17/18* (2013.01); *G06F 2111/08* (2020.01)

(58) Field of Classification Search
CPC ..... G06F 30/367; G06F 17/18; G06F 2111/08
USPC ........................................................ 716/106
See application file for complete search history.

(56) References Cited

U.S. PATENT DOCUMENTS

| | | | |
|---|---|---|---|
| 8,954,908 B1* | 2/2015 | Liu ........................ | G06F 30/367 716/106 |
| 2013/0226544 A1* | 8/2013 | Mcconaghy ............ | G06F 30/20 703/2 |
| 2020/0082041 A1* | 3/2020 | Albert ..................... | G06F 30/20 |

\* cited by examiner

*Primary Examiner* — Suresh Memula
(74) *Attorney, Agent, or Firm* — Kaplan Breyer Schwarz LLP

(57) ABSTRACT

The present disclosure relates to a method for probabilistic simulation of a microelectronic device, said method being implemented automatically by an electronic processing device and including the following steps:
a) defining a plurality of first samples of the device from a probability distribution of at least one physical parameter of the device;
b) for each first sample, determining, through an electrical simulation method, the value of at least one operating variable of the device;
c) defining, by regression from values of the physical parameters and operating variables of the first samples simulated in step b), a mathematical model approximating the response of the electrical simulation method.

14 Claims, 3 Drawing Sheets

PROBABILISTIC SIMULATION METHOD OF A MICROELECTRONIC DEVICE

TECHNICAL FIELD

The present disclosure relates to the field of probabilistic simulation methods of microelectronic devices, and in particular of integrated circuits.

BACKGROUND ART

Probabilistic simulation methods of operating variables of microelectronic devices have already been proposed. These methods, generally called Monte Carlo simulation methods, allow to generate, from a probability distribution of one or several physical parameters of the device, for example representative of manufacturing process variations of the device, a probability distribution of one or several operating variables of the device, for example one or several electrical variables of the device.

In order to obtain reliable enough simulations, the known probabilistic simulation methods of microelectronic devices require substantial computing resources.

It would be desirable to be able to have a method allowing, without reducing the reliability of the supplied simulations, to reduce the computational load with respect to the known methods.

SUMMARY OF INVENTION

To that end, one embodiment provides a method for probabilistic simulation of a microelectronic device, said method being implemented automatically by an electronic processing device and including the following steps:
a) defining a plurality of first samples of the device from a probability distribution of at least one physical parameter of the device;
b) for each first sample, determining, through an electrical simulation method, the value of at least one operating variable of the device;
c) defining, by regression from values of the physical parameters and operating variables of the first samples simulated in step b), a mathematical model approximating the response of the electrical simulation method;
d) defining second samples of the device;
e) for each second sample, calculating, from the mathematical model defined in step c), an estimated value of said at least one operating variable of the device; and
f) determining, from values of said at least one operating variable of the first samples determined in step b), and estimated values of said at least one operating variable of the second samples determined in step e), a statistical estimator characteristic of the probability distribution of said at least one operating variable.

According to an embodiment, the method further comprises, between step c) and step d), a step c1) for verifying that the mathematical model satisfies a predefined precision condition.

According to an embodiment, if it is determined in step c1) that the precision condition is not satisfied by the mathematical model, steps a), b) and c) are reiterated.

According to an embodiment, the precision condition comprises a criterion of minimizing a property representative of the error between the mathematical model and the results of the electrical simulation of the first and second samples.

According to an embodiment, the precision condition of step c1) comprises a criterion of completing a search for a first sample such that the value of said at least one operating variable is minimal, and for a first sample such that the value of said at least one operating variable is maximal.

According to an embodiment, said statistical estimator comprises a characteristic histogram of the probability distribution of said at least one operating variable.

According to an embodiment, to build the histogram, third samples of the device are defined, and, for each third sample, the value of said at least one operating variable of the device is determined by the electrical simulation method.

According to an embodiment, the histogram is built from values of said at least one operating variable of the first, second and third samples of the device.

According to an embodiment, the third samples are selected from among a set of candidate samples that are not yet electrically simulated, based on a relevance score calculated for each candidate sample from the mathematical model defined in step c).

According to an embodiment, said statistical estimator comprises at least one characteristic statistical moment of the probability distribution of said at least one operating variable.

According to an embodiment, the method comprises a step for calculating a characteristic numerical indicator of the precision of said at least one statistical moment, and a step for comparing said indicator with a reference numerical indicator.

According to an embodiment, said reference numerical indicator is a characteristic numerical indicator of the precision with which said at least one statistical moment would be determined by a brute force Monte Carlo simulation method.

According to an embodiment, said reference numerical indicator is extrapolated from the results of simulations of the first and third samples.

According to an embodiment, if the result of the comparison between the characteristic numerical indicator of the precision of said at least one statistical moment and the reference numerical indicator does not satisfy a predefined convergence condition, new third samples are defined and electrically simulated.

BRIEF DESCRIPTION OF DRAWINGS

The foregoing features and advantages, as well as others, will be described in detail in the following description of specific embodiments given by way of illustration and not limitation with reference to the accompanying drawings, in which.

DESCRIPTION OF EMBODIMENTS

Like features have been designated by like references in the various figures. In particular, the structural and/or functional features that are common among the various embodiments may have the same references and may dispose identical structural, dimensional and material properties.

For the sake of clarity, only the operations and elements that are useful for an understanding of the embodiments described herein have been illustrated and described in detail. In particular, the electronic data processing devices that can be used to implement the disclosed simulation methods have not been described in detail, the disclosed embodiments being compatible with all or most of the known electronic data processing devices, or the production and/or programming of such devices being within the capabilities of one skilled in the art from the functional information provided in the present disclosure.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

Unless specified otherwise, the expressions "around", "approximately", "substantially" and "in the order of" signify within 10%, and preferably within 5%.

Figure 1:
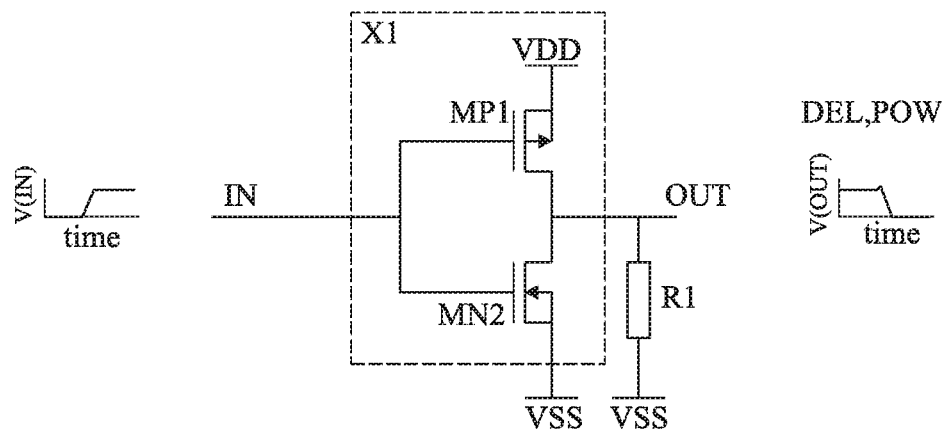
FIG. 1 is an electrical diagram of an example of a microelectronic device to which the described simulation methods can be applied.

FIG. 1 is an electrical diagram of an example of a microelectronic device to which the simulation methods disclosed hereinafter can be applied. In this example, a simple inverter made with a base of MOS transistors has been considered. This simple case will be used to illustrate the disclosed methods. Of course, these methods can be applied to different devices, and in particular to devices having much more complex electrical diagrams and a number of input variables and/or output variables greater than that of the example of FIG. 1.

The device of FIG. 1 comprises an inverter cell X1 comprising a combination in series of a P-channel MOS transistor MP1 and an N-channel MOS transistor MN2. The source of the transistor MP1 is connected to a node applying a high supply potential VDD, the drain of the transistor MP1 is connected to the drain of the transistor MN2, and the source of the transistor MN2 is connected to a node VSS applying a low supply potential VSS. The gates of the transistors MP1 and MN2 are connected to a same node IN applying an input signal, and the drains of the transistors MP1 and MN2 are connected to a same node OUT supplying an output signal. The device of FIG. 1 further comprises a resistance R1 having a first end connected to the node OUT and a second end connected to the node VSS. The resistance R1 corresponds to an output resistance of the cell X1. When the voltage V(IN) on the node IN (referenced relative to the node VSS) is one in a high state, for example substantially equal to VDD, the transistors MP1 and MN2 are respectively open (off) and closed (on). The voltage V(OUT) on the node OUT (referenced relative to the node VSS) is then in a low state, for example substantially equal to VSS. When the voltage V(IN) on the node IN is in a low state, for example substantially equal to VSS, the transistors MP1 and MN2 are respectively closed and open. The voltage V(OUT) on the node OUT is then in a high state, for example substantially equal to VDD.

In practice, due to manufacturing process variations, the threshold voltage VTH_MP1 of the transistor MP1 can take any value in a range from a minimum threshold voltage VTH_MP1_MIN to a maximum threshold voltage VTH_MP1_MAX, with a known probability distribution, for example according to a truncated Normal law. Similarly, the threshold voltage VTH_MN2 of the transistor MN2 can take any value in a range from a minimum threshold voltage VTH_MN2_MIN to a maximum threshold voltage VTH_MN2_MAX, with a known probability distribution, for example according to a truncated Normal law. VTH_MP1 and VTH_MN2 are physical parameters of the device, having an impact on electrical operating variables of the device, for example on the switching delay or time DEL of the output signal V(OUT) from the high state to the low state when the input signal V(IN) goes from the low state to the high state, or on the power POW consumed by the device during switching of the output signal V(OUT) from the high state to the low state.

An example of a problem that may be solved by implementing a probabilistic simulation of the device is as follows. Knowing the respective probability distributions of the values of the parameters VTH_MP1 and VTH_MN2, one seeks to determine the respective probability distributions of the values of the operating variables DEL and POW of the device. To solve such a problem, the known Monte Carlo simulation methods select random samples of sets of values (VTH_MP1, VTH_MN2), based on respective probability distribution laws of the parameters VTH_MP1 and VTH_MN2. For each sample, an electrical simulation of the device is implemented. At the end of each electrical simulation, a switching delay value DEL and a consumed power value POW are supplied by the electrical simulator. The values DEL and POW obtained for the different samples are next used to determine a probability distribution law of the value of the variable DEL and a probability distribution law of the value of the variable POW. In order to obtain a reliable simulation, that is to say, probability distribution laws of the variables DEL and POW that are representative of reality, it is generally necessary to simulate a large number of samples, which requires significant computing resources.

Figure 2:
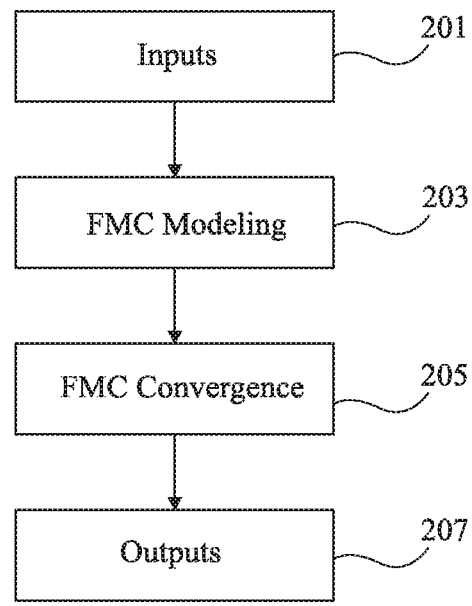
FIG. 2 is a logic diagram illustrating an exemplary embodiment of a probabilistic simulation method of a microelectronic device according to one embodiment.

FIG. 2 is a logic diagram illustrating an exemplary embodiment of a probabilistic simulation method of a microelectronic device according to one embodiment. This method can be implemented completely automatically by an electronic data processing device, for example a device including a microprocessor, for example a computer.

The method of FIG. 2 comprises a step 201 ("Inputs") for collecting input data of the simulation. The input data comprise a description of the microelectronic device, for example a description of the electrical diagram and components of the device. The input data further comprise the probability distribution laws of the values of one or several physical parameters of the device, hereinafter called input parameters. The input data also define the electrical operating variables for which one wishes to characterize the distribution, hereinafter called output variables. The input data can be supplied in the form of one or several electronic files, in any appropriate format, for example a text format, for example a format of the "netlist" type. In the scenario described in relation with FIG. 1, the input parameters are the threshold voltages VTH_MP1 and VTH_MN2 of the transistors MP1 and MN2, and the output variables are the switching delay DEL and the power POW of the inverter.

The method of FIG. 2 comprises, after step 201, a step 203 ("FMC Modeling") for determining a mathematical model configured to supply an estimate of the output variables from a set of input parameters. Step 203 will be described in more detail hereinafter in relation with FIG. 3.

The method of FIG. 2 additionally comprises, after step 203, a step 205 ("FMC Convergence") during which the mathematical model determined in step 203 is used to accelerate the convergence of a Monte Carlo simulation. Step 205 will be described in more detail hereinafter in relation with FIG. 4.

The method of FIG. 2 further comprises, after step 205, a step 207 ("Outputs") for supplying output data of the simulation. The output data can comprise a report including, for each output variable, characteristic statistical information of the distribution of the output variables, equivalent to those that would be obtained by a brute force Monte Carlo simulation. The output statistical information for example comprises statistical moments such as the average, the variance, the skewness and/or the kurtosis of each output variable. The output statistical information can further comprise a characteristic histogram of the probability distribution of each output variable. The output data can take the form of one or several electronic files, in any appropriate format, for example a text format.

Figure 3:
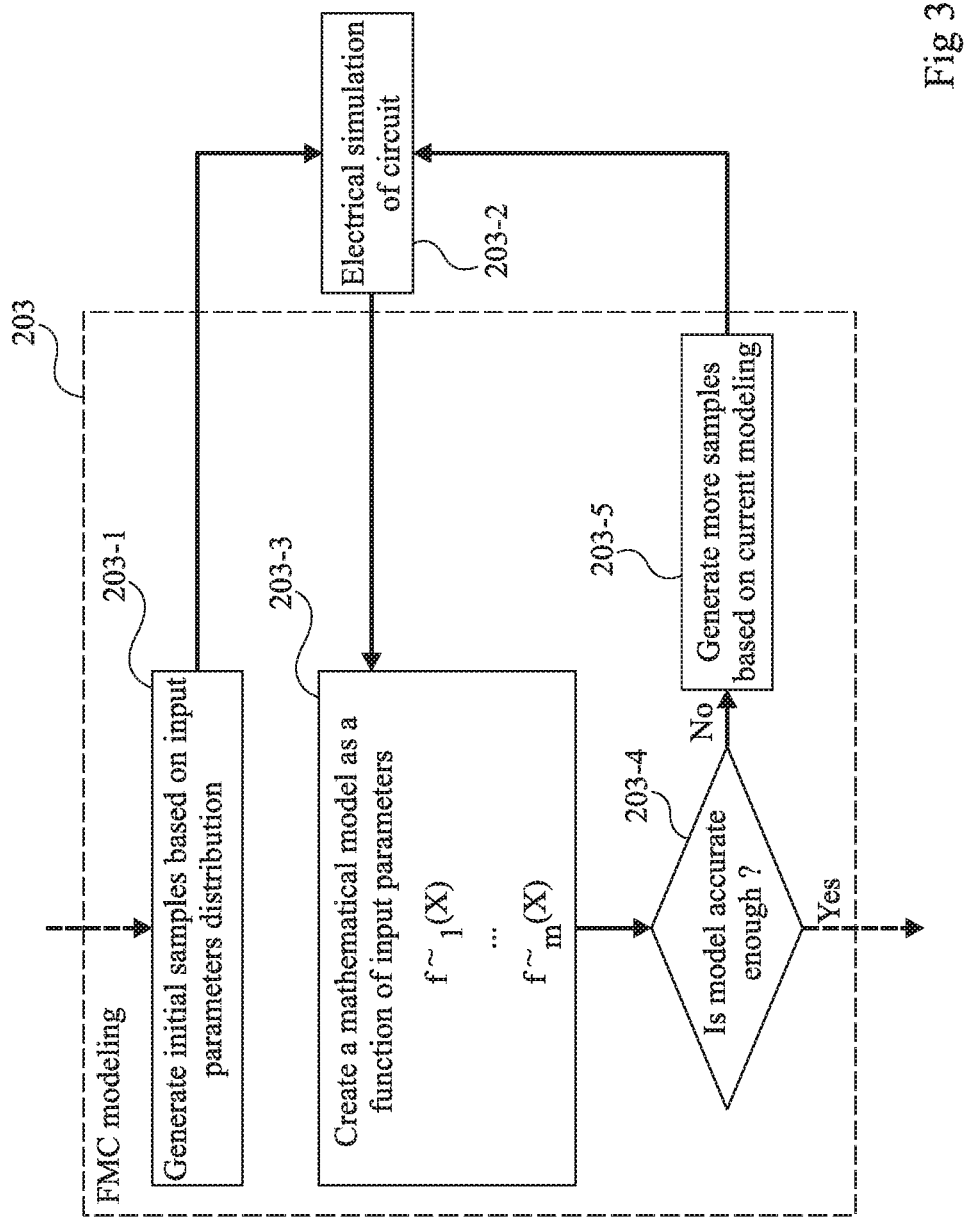
FIG. 3 is a logic diagram providing a more detailed illustration of an exemplary embodiment of a modeling phase of the simulation method of FIG. 2.

FIG. 3 is a logic diagram providing a more detailed illustration of an exemplary embodiment of the modeling phase 203 of the simulation method of FIG. 2.

In the remainder of the description:
p refers to the number (integer) of input parameters of the simulation,
n refers to the targeted equivalent number (integer) of drawings of a brute force Monte Carlo simulation,
m refers to the number (integer) of output variables of the simulation,
X refers to the input variable of the simulation, consisting of a set of p independent input parameters $X^h$ each having a defined probability distribution in a data input file, with h an integer ranging from 1 to p.
$p_X$ refers to the joint probability density function of the variable X,
$f_k(X)$ refers to the equivalent measurement functions of the electrical simulator, with k an integer ranging from 1 to m, each function $f_k(X)$ supplying the electrically simulated value of one of the m output variables from the set of input parameters X,
$\tilde{f}_k(X)$ refers to the modeling functions generated in step 203, each function $\tilde{f}_k(X)$ supplying an estimated value of one of the m output variables from the set of input parameters X,
$\tilde{F}_{k,X}$ refers to a statistical model associated with each function $\tilde{f}_k(X)$, this model supplying, for each value $\tilde{f}_k(X)$, a characteristic value of a probability distribution of the uncertainty of the model, for example a Gaussian distribution with average $\tilde{f}_k(X)$,
$p\tilde{F}_{k,X}$ refers to the density function of $\tilde{F}_{k,X}$,
$\tilde{X}_{k,min}$, respectively $\tilde{X}_{k,max}$, refers to a set of input parameters identified during the modeling phase 203, for which the estimated output variable $\tilde{f}_k(X)$ reaches a minimum, respectively a maximum.

In the scenario described hereinabove in relation with FIG. 1, p=m=2. The input parameters VTH_MP1 and VTH_MN2 for example both have a probability distribution of type N(0,1), that is to say, a normal distribution with zero average and standard deviation equal to 1. One then has $$p_X = pN(0, 1)(X^1) * pN(0, 1)(X^2),$$

$$\text{where } p_{N(\mu,\sigma)}(x) = \frac{1}{\sqrt{2\pi}\,\sigma} e^{-\frac{(x-\mu)^2}{2\sigma^2}}$$

is the (normal) Gaussian probability density function of the distribution $N(\mu,\sigma)$. $f_1(X)$ and $f_2(X)$ are respectively the delay DEL and the power POW measured by the electrical simulator during a switching of the output signal from the high state to the low state. The mathematical functions $\tilde{f}_1(X)$ and $\tilde{f}_2(X)$ are mathematical models respectively approximating the delay and power measurements of the electrical simulator. One for example considers an equivalent number of Monte Carlo drawings n=5000, that is to say, one seeks to obtain a simulation precision equivalent to that which would be obtained with a brute force Monte Carlo simulation with 5000 drawings.

One seeks here to estimate one or several characteristic statistical indicators of the functions $f_k(X)$ of the electrical simulator, that is to say, output variables of the device. For example, considering that X varies depending on the probability distribution function $p_x$, one seeks to estimate one or several statistical indicators among the following indicators:
average: $E[f_k]=\mu_{f_k}=\int f_k(x)p_X(x)dx$,
variance: $\text{Var}[f_k]=\sigma_{f_k}^2=\int (f_k(x)-\mu_{f_k})^2 p_X(x)dx$,
skewness: $\mu_3(f^k)=\int(x-\mu_{f_k})^3 p_X(x)dx$
order 4 central moment: $\mu_4(f^k)=\int(x-\mu_{f_k})^4 p_X(x)dx$ In the example of FIG. 3, the modeling phase 203 comprises a step 203_1 for generating a plurality of samples, called initial samples, of the microelectronic device. More specifically, during the step 203_1, one selects a plurality of sets of input parameters X with different values (1 sample=1 set of input parameters X). The samples generated in this step are for example drawn randomly, using a random or pseudo-random generator, taking account of the probability distribution $p_x$ of the input parameters. As a non-limiting example, the number of initial samples generated in step 203_1 is between 50 and 200.

During a step 203_2, the initial samples generated in step 203_1 are simulated using an electrical simulator, for example a software simulator, for example a simulator made using a SPICE simulation program. More generally, any other simulation method of a microelectronic device can be used in this step. The electrical simulator used in this step is not described in detail, the described embodiments being compatible with all or most of the known electrical simulation programs of microelectronic devices. At the end of step 203_2, one obtains, for each sample generated in step 203_1, an output set of variables $f_1(X), \ldots f_m(X)$ of the device.

During a step 203_3, one determines, from samples simulated in step 203_2, for each output variable of the device, a mathematical function $\tilde{f}_k(X)$ approximating the response of the electrical simulator used in step 203_2. The functions $\tilde{f}_k(X)$ can be generated by regression analysis, for example by linear regression, from input parameters of the initial samples and corresponding output variables supplied by the electrical simulator. As a variant, other modeling methods can be used in step 203_3, for example neural network, splines, Gaussian process regression, symbolic regression. The functions $\tilde{f}_k(X)$ have a lower computing complexity than that of the electrical simulator.

During a step 203_4, it is determined whether the mathematical model generated in step 203_3 satisfies a predetermined precision condition. As an example, during this step, one computes, for each function $\tilde{f}_k(X)$ of the model, a characteristic numerical indicator of the error between the function $\tilde{f}_k(X)$ and the values of the corresponding output variables supplied by the electrical simulator in step 203_2. The indicator can for example be an average error, for example the root mean square error, between the function $\tilde{f}_k(X)$ and the values of the output variables supplied by the electrical simulator. The precision condition is for example deemed satisfactory when the error indicators of the m functions f̃_k(X) of the model are all below predetermined thresholds. If, in step 203_4, the mathematical model does not satisfy the required precision condition (no), new samples are selected during a step 203_5. These samples are simulated by the electrical simulator (step 203_2), then steps 203_3 and 203_4 are carried out again taking the new simulated samples into account. When, in step 203_4, the mathematical model satisfies the required precision condition (yes), the modeling phase 203 ends and the convergence phase 205 begins.

During the modeling phase 203, a search for extreme values (minimum and maximum) of the output variables is implemented. More specifically, one seeks to select, in step 203_1 or step 203_5, for each of the m output variables of the device, a set of input parameters X leading to minimizing, respectively maximizing, the value of the output variable. Taking electrical simulations of these extreme samples into account allows to significantly improve the quality of the model. As an example, the search for extreme samples is done in step 203_5 using the provisional model previously built in step 203_3. In addition to an indicator representative of the error between the model and the simulated samples, the precision condition implemented in step 203_4 can comprise a criterion for completion of the search for extreme values. Here, $\tilde{X}_{k,min}$, respectively $\tilde{X}_{k,max}$, refer to the set of input parameters identified during the modeling phase 203, for which the estimated output variable $f_k(X)$ reaches a minimum, respectively a maximum.

During the modeling phase 203, a statistical uncertainty model $\tilde{F}_{k,X}$ can further be supplied. The model $\tilde{F}_{k,X}$ allows to determine, for each function $\tilde{f}_k$ of the mathematical model and for each set of input parameters X, a value representative of the uncertainty on the value $\tilde{f}_k(X)$ supplied by the mathematical model. As an example, the variable $\tilde{F}_{k,X}$ follows a normal law or a Student law. For example, the variable $\tilde{F}_{k,X}$ is the normal distribution $N(\tilde{f}_k(X), \tilde{\sigma}(X))$, where $\tilde{\sigma}(X)$ is a function of the set of input parameters X.

Figure 4:
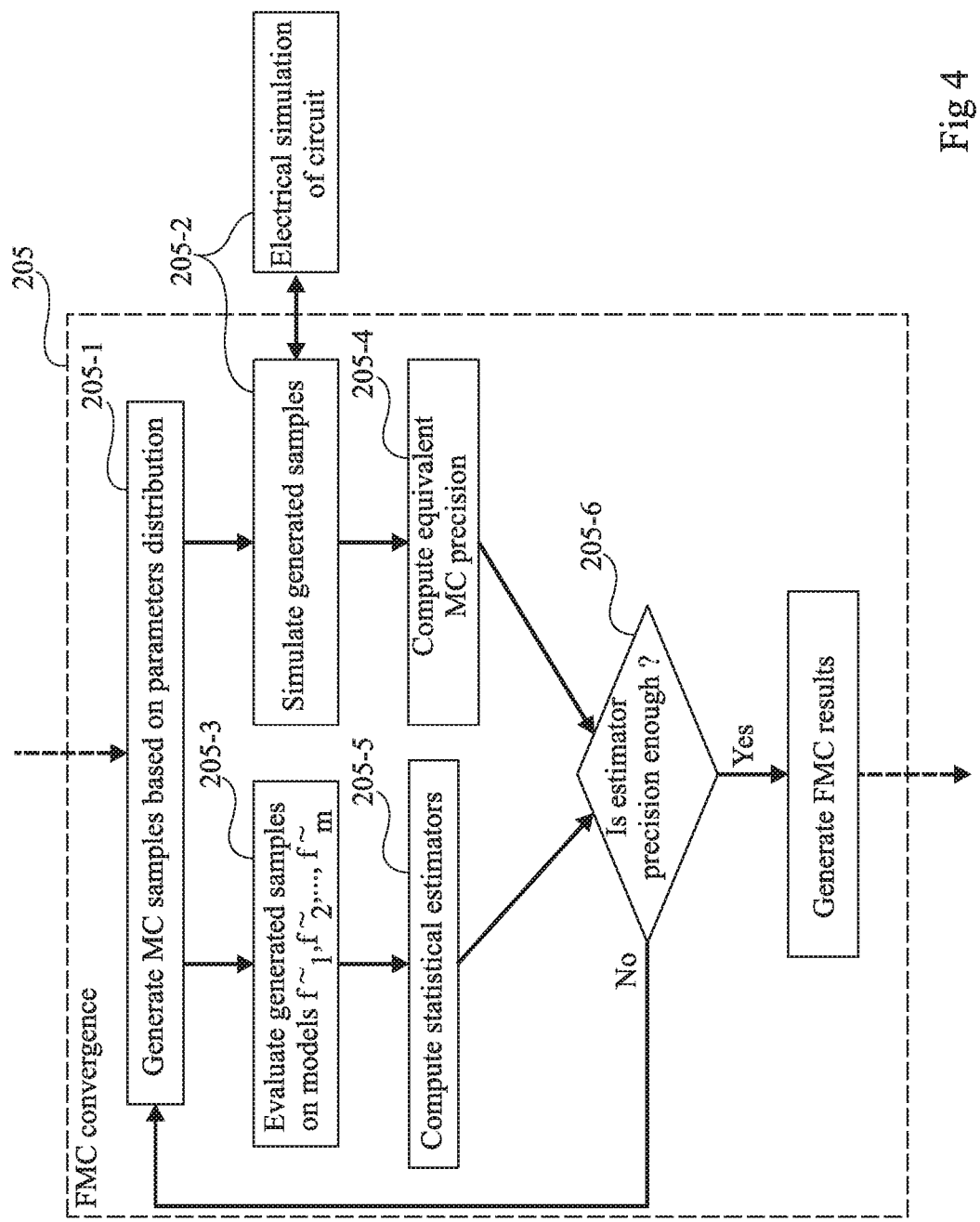
FIG. 4 is a logic diagram providing a more detailed illustration of an exemplary embodiment of a convergence phase of the simulation method of FIG. 2.

FIG. 4 is a logic diagram providing a more detailed illustration of an exemplary embodiment of the convergence phase 205 of the simulation method of FIG. 2.

During a step 205_1, a new drawing of samples to be simulated, that is to say, a new drawing of sets of input parameters X, is done, taking account of the probability distribution $p_x$ of the input variable X.

During a step 205_2, the samples drawn in step 205_1 are simulated using the electrical simulator. One thus obtains, for each new sample selected in step 205_1, a set of output variables $f_1(X), \ldots f_m(X)$ of the device.

During a step 205_3, these same new samples are evaluated by the mathematical model generated during the modeling phase 203. One thus obtains, for each new sample, a set of estimated output variables $\tilde{f}_1(X), \ldots \tilde{f}_m(X)$.

During the convergence phase 205, one seeks to accelerate the convergence of a precision indicator of the simulation, through variance reduction techniques, by combining the results of the simulations done in step 205_2 and the estimates supplied by the mathematical model in step 205_3. The convergence phase ends when a stop criterion is reached, based on an estimate of a characteristic indicator of the precision of a statistical estimator of the distribution of the output variables of the device.

During a step 205_4 following step 205_2, an indicator of the precision that would be obtained with a brute force Monte Carlo simulation with n drawings, called equivalent precision indicator, is calculated from the set of available electrical simulation results, that is to say, the results of the electrical simulations done during the modeling phase 203 (step 203_2), and the results of the electrical simulations done in step 205_2. Hereinafter, n0 will refer to the number of electrical simulations available in step 205_4, with n0<n.

Let $EX=(X_1, X_2, \ldots X_N)$ be a set of N sets of independent input parameters identically distributed according to the distribution $p_x$.

The statistical estimator whose precision one wishes to characterize can be an average estimator, defined as follows for each of the functions $f_k(X)$ of the electrical simulator:

$$\mu_{f_k,EX,N} = \frac{1}{N}\sum_{i=1}^{N} f_k(X_i)$$

Its expected value is then as follows:

$$E[\mu_{f_k,EX,N}] = \mu_{f_k} \qquad (eq.\ 1.1)$$

And its variance is then as follows:

$$\text{Var}(\mu_{f_k,EX,N}) = \frac{\sigma_{f_k}^2}{N} \qquad (eq.\ 1.2)$$

As a variant, the statistical estimator whose precision one wishes to characterize can be a variance estimator, defined as follows for each function $f_k(X)$ of the electrical simulator:

$$S'^2_{f_k,EX,N} = \frac{1}{N-1}\sum_{i=1}^{N}(f_k(X_i) - \mu_{f_k,EX,N})^2 \qquad (eq.\ 2.1)$$

Its expected value is then as follows:

$$E[S'^2_{f_k,EX,N}] = \sigma_{f_k}^2$$

And its variance is then as follows:

$$\text{Var}(S'^2_{f_k,EX,N}) = \frac{1}{N}\left(\mu_4(f_k) - \frac{N-3}{N-1}\sigma_{f_k}^4\right) \qquad (eq.\ 2.2)$$

For each estimator, the variance of the estimator corresponds to an asymptotic confidence interval CI, defined as follows.

Let $C=1-\alpha_c$ be the targeted confidence level of the estimator, for example C=95%, and $\Phi$ the cumulative density function (CDF) of the normal distribution, defined as follows:

$$\Phi(x) = \frac{1}{\sqrt{2\pi}}\int_{-\infty}^{x} e^{-\frac{t^2}{2}} dt$$

Or:

$$Z_\alpha = \Phi^{-1}\left(1 - \frac{\alpha_c}{2}\right)$$

And:

$$\mu_{\theta_k} = \theta_{f_k,EX,N}$$

With $\theta_{f_k,EX,N}$ the considered statistical estimator, for example the average ($\mu_{f_k,EX,N}$) or variance ($S'^2_{f_k,EX,N}$) estimator defined above, and $\sigma_{\theta_k}^2$ an of the variance of $\theta_{f_k,EX,N}$.

For example, for the average estimator, one has, from equations eq. 1.2 and eq. 2.1:

$$\sigma_{\theta_k}^2 = \frac{s'^2_{f_k,EX,N}}{N}$$

The confidence interval CI of the estimator $\theta_{f_k,EX,N}$ is then given by $$CI = \left[\mu_{\theta_k} - Z_\alpha \frac{\sigma_{\theta_k}}{\sqrt{N}}, \mu_{\theta_k} + Z_\alpha \frac{\sigma_{\theta_k}}{\sqrt{N}}\right] \quad \text{(eq. 3.1)}$$

And the half-width of the confidence interval CI is defined as follows:

$$\Delta_{\theta_k} = Z_\alpha \frac{\sigma_{\theta_k}}{\sqrt{N}} \quad \text{(eq. 3.2)}$$

In the case of the average estimator, to extrapolate the equivalent confidence interval CI that would be obtained with a brute force Monte Carlo simulation with n drawings, equation 1.2 can be used. However, given that the variance $\sigma_{f_k}^2$ is not known, the estimate of the variance $S'^2_{f_k,EX,N}$ is substituted for it.

If one considers N=n0, based on the first n0 electrically simulated samples, the coordinates of the n0 points ($A_i$, $B_i$) defined as follows:

$$(A_i, B_i) = \left(i, \sqrt{\frac{s'^2_{f_k,EX,N}}{i}}\right),$$

with i an integer from 1 to n0.

These points, drawn on a 2D diagram on a logarithmic scale, are interpolated along a linear model. In other words, a linear interpolation of the points (log $A_i$, log $B_i$) is done.

Let log B=$\alpha$ log A+$\gamma$ be the determined linear model.

By calling $B_n$ the value extrapolated from this model for A=n, one has:

log $B_n$=$\alpha$ log $n$+$\gamma$ or $B_n$=$e^{\alpha \log n + \gamma}$

The value $B_n$ is used to estimate the half-width of the confidence interval CI that one would obtain, for the average estimator, with a brute force Monte Carlo simulation with n drawings, as follows:

$$\Delta_{\theta_k} = Z_\alpha B_n \quad \text{(eq. 3.3)}$$

A similar computation can be implemented for the variance estimator. In this case, $B_i$ is derived from equation eq. 2.2 with the estimators of $\mu_4(f_k)$ and $\sigma_{f_k}^2$. More generally, a similar computation can be implemented whatever the considered statistical moment is.

During a step 205_5 following the steps 205_3 and 205_2, one or several statistical estimators of the distribution of the output variables of the microelectronic device are estimated, taking account of all of the results of the n0 electrical simulations already done, as well as output variables calculated from the mathematical model generated in step 203.

This estimate is based on control variate techniques with the aim of accelerating the Monte Carlo convergence.

Let EX' be a set of N' independent and identically distributed samples (different from EX). One assumes N'>>n, for example N'=50n. Hereinafter, it will be considered that N=n0.

Unlike the set EX, the samples of the set EX' are not used to perform electrical simulations, but are only evaluated by the mathematical model generated in step 203, in order to calculate characteristic statistical indicators of the model, and to calculate an asymptomatic confidence interval of the statistical estimator(s) of the output variable distribution.

Let $\theta_{f_k}$ be a statistical moment of the function $f_k$, for example the average ($\theta_{f_k}=\mu_{f_k}$) or the variance ($\theta_{f_k}=\sigma^2_{f_k}$).

Let $\theta_{f_k,EX,N}$ be a statistical estimator of the function $f_k$, based on the n0 samples of the set EX, for example $\theta_{f_k,EX,N}=\mu_{f_k,EX,N}$ for the average, and $\theta_{f_k,EX,N}=S'^2_{f_k,EX,N}$ for the variance.

Then, similarly, $\theta_{\tilde{f}_k,EX,N}$ is the corresponding statistical estimator of the function $\tilde{f}_k$ based on the n0 samples of the set EX, and $\theta_{\tilde{f}_k,EX,N}$ is the statistical estimator of the function $\tilde{f}_k$ based on the N' samples of the set EX'.

The control variate estimator can be defined as follows:

$$\theta_{f_k,EX,EX'} = \theta_{f_k,EX,N} - \beta(\theta_{\tilde{f}_k,EX,N} - \theta_{\tilde{f}_k,EX',N'}) \quad \text{(eq. 4.1)}$$

Where $\beta$ is a parameter of the control variate technique.

Considering $\beta$ to be constant and independent of the sets EX and EX', and $\tilde{f}_k$ independent of the sets EX and EX', then:

$$E[\theta_{f_k,EX,EX'}] = \theta_{f_k}$$

$$\text{Var}(\theta_{f_k,EX,EX'}) = \text{Var}(\theta_{f_k,EX,N}) - 2\beta \text{Cov}(\theta_{f_k,EX,N}, \theta_{\tilde{f}_k,EX,N}) + \beta^2(\text{Var}(\theta_{\tilde{f}_k,EX,N}) + \text{Var}(\theta_{\tilde{f}_k,EX',N'})) \quad \text{(eq. 4.2)}$$

Where the covariance is defined as follows:

$$\text{Cov}(f_k,\tilde{f}_k) = \int (f_k(x)-\mu_{f_k})(\tilde{f}_k(x)-\mu_{\tilde{f}_k})p_x(x)dx$$

The fastest convergence occurs when the variance of the control variate is minimal, or for:

$$\beta_{min} = \operatorname{argmin}_\beta(\text{Var}(\theta_{f_k,EX,EX'})) = \frac{\text{Cov}(\theta_{f_k,EX,N}, \theta_{\tilde{f}_k,EX,N})}{\text{Var}(\theta_{\tilde{f}_k,EX,N}) + \text{Var}(\theta_{\tilde{f}_k,EX',N'})}$$

The optimal parameter $\beta_{min}$ can for example be estimated from samples other than those of the sets EX and EX'.

An asymptotic confidence interval CI can be derived from equations eq. 3.1 and eq. 3.2 above.

Let $\sigma^2_{f_k,EX,EX'}$ be an estimate of Var($\theta_{f_k,EX,EX'}$). The interval CI is then given by:

$$CI = \left[\theta_{f_k,EX,EX'} - Z_\alpha \frac{\sigma_{\theta_{f_k,EX,EX'}}}{\sqrt{N}}, \theta_{f_k,EX,EX'} + Z_\alpha \frac{\sigma_{\theta_{f_k,EX,EX'}}}{\sqrt{N}}\right]$$

And the half-width of the confidence interval CI is expressed as follows:

$$\Delta_{\theta_{f_k,EX,EX'}} = Z_\alpha \frac{\sigma_{\theta_{f_k,EX,EX'}}}{\sqrt{N}} \quad \text{(eq. 4.3)}$$

In the case of an average estimate, one has:

$$\sigma^2_{f_k,EX,N} = S'^2_{f_k,EX,N} - 2\beta S'_{f_k,\tilde{f}_k,EX,N} + \beta^2(S'^2_{\tilde{f}_k,EX,N} + S'^2_{\tilde{f}_k,EX',N'})$$

With the covariance estimate defined as follows:

$$S'^2_{f_k,f_{\tilde{k}}^{\sim} EX,N} = \frac{1}{N-1} \sum_{i=1}^{N} (f_k(X_i) - \mu_{f_k,EX,N})(f_k^{\sim}(X_i) - \mu_{f_k^{\sim},EX,N})$$

More generally, if one considers that the parameter β or the modeling function $f^{\sim}_k$ depends on the set EX or the set EX', then equation eq. 4.2 hereinabove is no longer verified and the estimator is biased. Equation eq. 4.1 can be adapted to take this bias into account.

During step 205_5, a histogram of the probability distribution of the output variables of the microelectronic device can further be generated.

Let $n_{bins}$ be the number of bins of the histogram that will be generated by a brute force Monte Carlo simulation method. As an example, the number $n_{bins}$ can be determined by the Sturges rule:

$n_{bins} = 1 + \lceil \log_2(n) \rceil$, where $\lceil x \rceil$ is the ceiling function (smallest integer greater than or equal to x).

And let $$\Delta_h = \frac{f_k(X^{\sim}_{k,max}) - f_k(X^{\sim}_{k,min})}{n_{bins}}$$

be the bin width of the histogram of output k.

The values $f_k(X^{\sim}_{k,min})$ and $f_k(X^{\sim}_{k,max})$ have been determined beforehand, during the modeling phase 203, during the search for extreme values. An additional bin can be added for values below $f_k(X^{\sim}_{k,min})$, and another for values above $f_k(X^{\sim}_{k,max})$. These two additional bins can help account for any new simulated samples that fall outside the interval $[f_k(X^{\sim}_{k,min}), f_k(X^{\sim}_{k,max})]$.

Thus, the bin intervals $B_j$ of the histogram of output k, with j an integer from 0 to $n_{bins}+1$, are defined as follows:

$B_0 = ]-\infty, f_k(X^{\sim}_{k,min})[$ $B_j = [f_k(X^{\sim}_{k,min}) + (j-1)\Delta_h f_k(X^{\sim}_{k,min}) + j\Delta_h[$ for $1 \leq j < n_{bins}$ $B_{n_{bins}} = [f_k(X^{\sim}_{k,min}) + (n_{bins}-1)\Delta_h f_k(X^{\sim}_{k,min}) + n_{bins} \Delta_h] = [f_k(X^{\sim}_{k,max}) - \Delta_h f_k(X^{\sim}_{k,max})]$ $B_{n_{bins}+1} = ]f_k(X^{\sim}_{k,max}), \infty[$ Let $I_{s_0}$ be the set of indices i in the interval from 1 to n, for which the first i samples $X_1, \ldots X_i$ have already been simulated, and let $|I_{s_0}|$ be the cardinal (number of values) of $I_{s_0}$ (it will be noted that $|I_{s_0}| \geq n$, $I_{s_0} \geq 0$).

Let $I_S$ be the set of indices i in the interval from 1 to n, for which the sample $X_i$ has already been simulated, and let $|I_s|$ be the cardinal of $I_s$ (it will be noted that $|I_s| \geq |I_{s_0}|$).

Let $I_m = \{1 \leq r \leq n\} \setminus I_s = \{1 \leq r \leq n, r \notin I_s\}$ be the set of indices i in the interval from 1 to n, for which the sample $X_i$ has not yet been simulated, and let $|I_m|$ be the cardinal of $I_m$.

Let $H_{s_0}$ be a histogram of output k, according to the bin intervals $B_j$ defined above, of $|I_{s_0}|$ samples, based solely on the samples already simulated during steps 203_2 and 205_2. More specifically, let $F_j(H_{s_0})$ be the frequency for each interval $B_j$ ($0 \leq j \leq n_{bins}+1$):

$$F_j(H_{s_0}) = \frac{|\{r \in I_{s_0}, f_k(X_r) \in B_j\}|}{|I_{s_0}|}$$

Let $H_m$ be a histogram of output k, according to the bin intervals $B_j$, of n values, based on samples already simulated during steps 203_2 and 205_2 if they are available, or on values generated by the mathematical model built during phase 203 for the non-simulated samples. More specifically, let $F_j(H_m)$ be the frequency for each interval $B_j$ ($0 \leq j \leq n_{bins}+1$):

$$F_j(H_m) = \frac{|\{r \in I_s, f_k(X_r) \in B_j\}| + |\{r \in I_m, f_k^{\sim}(X_r) \in B_j\}|}{n}$$

Let $N_j$ be the set of indices of the non-simulated samples in the vicinity of the interval $B_j$. More specifically:

$N_j = \{1, l \in I_m, f^{\sim}_k(X_l) \in B_u$ for all $u \in [\max(0, j-W_N), \min(n_{bins}+1, j+W_N)]\}$, where $W_N$ defines the considered vicinity, with $W_N \geq 1$, for example $W_N = 1$.

It is possible to build, for each bin interval $B_j$, a group of indices of candidate samples belonging to the set $I_m$ of samples not yet simulated, by assigning each index a relevance score of the sample to help increase the precision of the value of the bin $B_j$ of the histogram $H_m$.

Let $C_j$ be the set of pairs of values ("candidate index", "relevance score") of the bin $B_j$ (j ranging from 0 to $n_{bins}+1$), defined as follows:

Case j=0 or j=$n_{bins}$+1 (additional bins):
 If $F_j(H_m)=0$, then $C_j=\emptyset$ (no candidate)
 If $F_j(H_m)>0$, then
  For each index l in $N_j$, compute the probability $p_{j,l}$ for the mathematical model to provide an output value inside the bin $B_j$, when sample $X_l$ is used as an input:

$p_{j,l} = \int_{B_j} F^{\sim}_{k,X_l}(x)dx$

The relevance score $S_{j,l}$ is then computed as follows:
 If $f^{\sim}_k(X_l) \in B_j$ then $S_{j,l} = 1 - p_{j,l}$
 Else $S_{j,l} = -\infty$ (not worthy)
Finally, C is defined as follows:

$C_j = \{(l, S_{j,l}), l \in N_j, S_{j,l} > 0\}$

Case $1 \leq j \leq n_{bins}$:
The confidence interval $CI_{H_{s_0}j}$ of $B_j$ bin frequency for histogram $H_{s_0}$ is computed. Various methods can be used for this computation, such as the Normal Confidence Interval, the Wilson Score Confidence Interval, or any other method adapted for binomial distributions.

Similarly, let $CI_{H_m j}$ be the confidence interval of $B_j$ bin frequency for histogram $H_m$.

If $CI_{H_{S_0},j} \cap CI_{H_m,j} \neq \emptyset$ (the confidence intervals intersect)
 Or $|F_j(H_{S_0}) - F_j(H_m)| \leq \alpha_{pr} F_j(H_{S_0})$ (the precision is sufficient, where $\alpha_{pr}$ is a precision margin, for example equal to 5%)
 Then $C_j = \emptyset$ (no candidate)
 Else
  For each index l in $N_j$, compute the probability $p_{j,l}$ for the mathematical model to provide an output value inside the bin $B_j$, when sample $X_l$ is used as an input:

$p_{j,l} = \int_{B_j} F^{\sim}_{k,X_l}(x)dx$

The relevance score $S_{j,l}$ is then computed as follows:
If $F_j(H_m) > F_j(H_{S_0})$ and $\tilde{f}_k(X_l) \in B_j$ then $S_{j,l} = 1 - p_{j,l}$
Else if $F_j(H_m) \leq F_j(H_{S_0})$ and $\tilde{f}_k(X_l) \notin B_j$ then $S_{j,l} = p_{j,l}$
Else $S_{j,l} = -\infty$ (not worthy)

Finally, $C_i$ is defined as follows:

$$C_j = \{(l, S_{j,l}), l \in N_j, S_{j,l} > 0\}$$

The whole pool of candidate samples for the simulation is $C = \cup_{0 \leq j \leq n_{bins}+1} C_j$ This pool is limited to a predefined number $N_{hist}$ of samples, for example $N_{hist} = 10 \cdot n_{bins}$, by selecting $N_{hist}$ candidates in C, equally distributed among the pools $C_j$, wherein the candidates selected in each pool $C_j$ are those having the highest relevance scores $S_{j,l}$.

More formally, let $I_f$ be the final set of sample indexes selected in C for simulation. The set $I_f$ is constructed as follows:

$$I_f \leftarrow \emptyset$$

while $|I_f| < N_{hist}$ and $|\cup_{0 \leq j \leq n_{bins}+1} C_j| > 0$ do
   for $0 \leq j \leq n_{bins}+1$ do
     if $|I_f| < N_{hist}$ then
       remove from $C_j$ the pair $(l^b, S_{j,l}^b)$ having the highest score $S_{i,j}$
       and $I_f \leftarrow I_f \cup \{l^b\}$
     fi
   done
done At the end of this process, the set $I_f$ contains the new samples to be simulated for histogram convergence.

After steps 205_4 and 205_5, a step 205_6 is carried out, during which it is verified for each output whether the statistical estimators calculated in step 205_5 satisfy a precision condition. The stop criterion used in this step is based on the confidence interval CI of the moment estimator calculated in step 205_5, the number of candidate sample in final set for histogram in step 205_5, and the equivalent confidence interval of a brute force Monte Carlo simulation extrapolated in step 205_4.

The stop criterion for the moment estimator determined in step 205_5 is defined as follows. The moment estimator is considered to be precise enough if:

the half-width of the confidence interval calculated in step 205_5 (equation eq. 4.3) is less than the half-width of the extrapolated equivalent confidence interval in step 205_4 (equation eq. 3.3):

$$\Delta_{\theta_{f_k}, EX, EX'} \leq Z_\alpha B_n$$

or the half-width of the confidence interval calculated in step 205_5 (equation eq. 4.3) is less than a predefined precision $\alpha_{pr}$, for example in the order of 5%:

$$\Delta_{\theta_{f_k}, EX, EX'} \leq \alpha_{pr} |\theta_{f_k, EX, EX'}|$$

The stop criterion for the histogram is in turn inherent to the construction algorithm of the histogram described hereinabove. More specifically, the histogram is considered to be precise enough when $|I_f| = 0$ Thus, the final stop criterion, or precision condition for the output k, of the convergence phase 205 is defined as follows:

$$\left( \left( \Delta_{\theta_{f_k}, EX, EX'} \leq Z_\alpha B_n \right) \text{ or } \left( \Delta_{\theta_{f_k}, EX, EX'} \leq \alpha_{pr} |\theta_{f_k, EX, EX'}| \right) \right) \text{ and}$$

$$(|I_f| = 0)$$

If the precision condition is not satisfied (no), new samples are simulated including those of the final histogram set $I_s$ and consecutive MC samples after the first n0 already simulated. In other words, steps 205_1, 205_2, 205_3, 205_4 and 205_5 are reiterated. The number n0 is incremented by the number $n_{new}$ of new simulated samples, for example in the order of 50.

If the precision condition is satisfied (yes), electronic result files of the simulation are generated during a step 205_7, then step 205 finishes. As an example, the output electronic files comprise a histogram representative of the distribution of the simulated output variables, as well as one or several characteristic statistical moments of the distribution of the simulated output variables.

One advantage of the fast Monte Carlo simulation method described hereinabove is that it allows to reduce considerably the number of electrical simulations to be done relative to a brute force Monte Carlo simulation, with an equivalent output precision. As an illustrative example, the method described hereinabove allowed, in the scenario described in relation with FIG. 1, with only 331 electrical simulations of samples of the device, to obtain distribution histograms of the output variables DEL and POW and statistical estimators (average, standard deviation, skewness and kurtosis) characteristic of the distributions of the output variables DEL and POW, with a precision equivalent to that of a brute force Monte Carlo simulation with 5000 drawings (n=5000).

From the supplied simulation results, the electronic processing device will for example be able to verify that the simulated microelectronic devices satisfies predefined specifications. If the microelectronic device does not satisfy the required specifications, it will have to be modified and a new simulation will be able to be implemented. If the microelectronic devices satisfies the required specifications, it will able to be manufactured as is, that is to say, according to the description supplied in the electronic input files of the simulation.

Various embodiments and variants have been described. Those skilled in the art will understand that certain features of these embodiments can be combined and other variants will readily occur to those skilled in the art. In particular, the described embodiments are not limited to the exemplary statistical estimators described hereinabove.

Finally, the practical implementation of the embodiments and variants described herein is within the capabilities of those skilled in the art based on the functional description provided hereinabove. In particular, the automated implementation of the simulation method disclosed hereinabove, by a suitable electronic data processing device, receiving, as input, electronic files describing the electronic device to be simulated and the simulation to be done, and supplying, as output, electronic files containing statistical data characteristic of the probability distribution of the output variables of the electronic device, is within the capabilities of one skilled in the art from the functional description of the present disclosure.

The invention claimed is:

1. A method for probabilistic simulation of a microelectronic device, said method being implemented automatically by an electronic processing device and including the following steps:
   a) defining a plurality of first samples of the device from a probability distribution of at least one physical parameter of the device;
   b) for each first sample, determining, through an electrical simulation method, the value of at least one operating variable of the device;
   c) defining, by regression from values of the physical parameters and operating variables of the first samples simulated in step b), a mathematical model approximating the response of the electrical simulation method;
   d) defining second samples of the device;
   e) for each second sample, calculating, from the mathematical model defined in step c), an estimated value of said at least one operating variable of the device; and
   f) determining, from values of said at least one operating variable of the first samples determined in step b), and estimated values of said at least one operating variable of the second samples determined in step e), a statistical estimator characteristic of the probability distribution of said at least one operating variable.

2. The method according to claim 1, further comprising, between step c) and step d), a step c1) for verifying that the mathematical model satisfies a predefined precision condition.

3. The method according to claim 2, wherein, if it is determined in step c1) that the precision condition is not satisfied by the mathematical model, steps a), b) and c) are reiterated.

4. The method according to claim 2, wherein the precision condition comprises a criterion of minimizing a property representative of the error between the mathematical model and the results of the electrical simulation of the first and second samples.

5. The method according to claim 2, wherein the precision condition of step c1) comprises a criterion of completing a search for a first sample such that the value of said at least one operating variable is minimal, and for a first sample such that the value of said at least one operating variable is maximal.

6. The method according to claim 1, wherein said statistical estimator comprises a characteristic histogram of the probability distribution of said at least one operating variable.

7. The method according to claim 6, wherein to build the histogram, third samples of the device are defined, and, for each third sample, the value of said at least one operating variable of the device is determined by the electrical simulation method.

8. The method according to claim 7, wherein the histogram is built from values of said at least one operating variable of the first, second and third samples of the device.

9. The method according to claim 7, wherein the third samples are selected from among a set of candidate samples that are not yet electrically simulated, based on a relevance score calculated for each candidate sample from the mathematical model defined in step c).

10. The method according to claim 7, wherein said statistical estimator comprises at least one characteristic statistical moment of the probability distribution of said at least one operating variable.

11. The method according to claim 10, comprising a step for calculating a characteristic numerical indicator of the precision of said at least one statistical moment, and a step for comparing said indicator with a reference numerical indicator.

12. The method according to claim 11, wherein said reference numerical indicator is a characteristic numerical indicator of the precision with which said at least one statistical moment would be determined by a brute force Monte Carlo simulation method.

13. The method according to claim 12, wherein said reference numerical indicator is extrapolated from the results of simulations of the first and third samples.

14. The method according to claim 11, wherein, if the result of the comparison between the characteristic numerical indicator of the precision of said at least one statistical moment and the reference numerical indicator does not satisfy a predefined convergence condition, new third samples are defined and electrically simulated.

* * * * *